(12) United States Patent
Hwang et al.

(10) Patent No.: US 11,310,018 B2
(45) Date of Patent: Apr. 19, 2022

(54) METHOD FOR TRANSMITTING UPLINK SIGNAL OF TERMINAL IN WIRELESS COMMUNICATION SYSTEM AND TERMINAL USING SAME METHOD

(71) Applicant: LG Electronics Inc., Seoul (KR)

(72) Inventors: Daesung Hwang, Seoul (KR); Duckhyun Bae, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 16/635,114

(22) PCT Filed: Aug. 1, 2018

(86) PCT No.: PCT/KR2018/008740
§ 371 (c)(1),
(2) Date: Jan. 29, 2020

(87) PCT Pub. No.: WO2019/027251
PCT Pub. Date: Feb. 7, 2019

(65) Prior Publication Data
US 2020/0252190 A1    Aug. 6, 2020

Related U.S. Application Data

(60) Provisional application No. 62/540,552, filed on Aug. 2, 2017.

(51) Int. Cl.
*H04L 5/00* (2006.01)
*H04L 1/00* (2006.01)
(Continued)

(52) U.S. Cl.
CPC .......... *H04L 5/0098* (2013.01); *H04L 1/0061* (2013.01); *H04L 5/0051* (2013.01);
(Continued)

(58) Field of Classification Search
CPC ... H04L 5/0098; H04L 1/0061; H04L 5/0051; H04L 25/0226; H04W 76/11;
(Continued)

(56) References Cited

U.S. PATENT DOCUMENTS

| 2018/0035459 A1* | 2/2018 | Islam ................... H04W 74/04 |
| 2018/0041957 A1* | 2/2018 | Xiong .................. H04W 76/14 |

(Continued)

FOREIGN PATENT DOCUMENTS

| WO | WO2016167828 | 10/2016 | |
| WO | WO 2017/039564 | 3/2017 | |
| WO | WO-2018031620 A1 * | 2/2018 | ........... H04L 5/0051 |

OTHER PUBLICATIONS

Nokia et al., On L1 activation for UL grant-free URLLC transmission, 3GPP TSG-RAN WG1 Meeting #89, Hangzhou, P. R. China, May 15-19, 2017, R1-1708524. (Year: 2017).*
(Continued)

*Primary Examiner* — Shailendra Kumar
(74) *Attorney, Agent, or Firm* — Fish & Richardson P.C.

(57) ABSTRACT

Provided are a method for transmitting an uplink signal of a terminal in a wireless communication system and a terminal using the same method. The method comprises: receiving activation information that activates or deactivates a specific resource set from among a plurality of resource sets; and performing a grant-less uplink transmission using the resources belonging to the specific resource set when the activation information activates the specific resource set.

12 Claims, 15 Drawing Sheets

(51) Int. Cl.
| | |
|---|---|
| *H04L 25/02* | (2006.01) |
| *H04W 72/04* | (2009.01) |
| *H04W 72/12* | (2009.01) |
| *H04W 76/11* | (2018.01) |
| *H04W 76/27* | (2018.01) |

(52) U.S. Cl.
CPC ....... *H04L 25/0226* (2013.01); *H04W 72/042* (2013.01); *H04W 72/1284* (2013.01); *H04W 76/11* (2018.02); *H04W 76/27* (2018.02)

(58) Field of Classification Search
CPC ............... H04W 76/27; H04W 72/042; H04W 72/1284; H04W 72/04
See application file for complete search history.

(56) References Cited

U.S. PATENT DOCUMENTS

| | | | | |
|---|---|---|---|---|
| 2018/0167161 | A1* | 6/2018 | Davydov | ............... H04L 1/0005 |
| 2018/0368175 | A1* | 12/2018 | Jeon | ...................... H04W 72/04 |
| 2020/0059867 | A1* | 2/2020 | Haghighat | .......... H04W 52/285 |

OTHER PUBLICATIONS

LG Electronics, Discussion on grant-free uplink transmission, 3GPP TSG-RAN WG1 Meeting #89, Hangzhou, P. R. China, May 14-19, 2017, R1-1707655. (Year: 2017).*

Ericsson, Grant Free and Semi-Persistent Scheduling in NR , 3GPP TSG-RAN WG2 #AH, Qingdao, P.R. of China, Jun. 27-29, 2017, R2-1707174 (Year: 2017).*

Samsung, UE-Common NR-PDCCH Transmission Aspects, 3GPP TSG RAN WG1 #89, Hangzhou, China, May 15-19, 2017, R1-1707999. (Year: 2017).*

Lenovo et al., Discussion of procedures for UL transmission with and without grant, 3GPP TSG RAN WG1 Meeting #89, Hangzhou, China May 15-19, 2017, R1-1707766 (Year: 2017).*

ZTE, Consideration on grant-free transmission, 3GPP TSG-RAN WG2 Meeting#98, Hangzhou, China, May 15-19, 2017, R2-1704699) (Year: 2017).*

Panasonic, Repetition/retransmission of UL grant-free, 3GPP TSG RAN WG1 Meeting #89 , Hangzhou, P.R. China May 15-19, 2017, R1-1708115. (Year: 2017).*

LG Electronics, "Discussion on grant-free uplink transmission", R1-1707655, 3GPP TSG RAN WG1 Meeting #89, Hangzhou, ChinaMay 14-19, 2017, 9 pages.

Nokia, Alcatel-Lucent Shanghai Bell, "On L1 activation for UL grant-free URLLC transmission", R1-1708524, 3GPP TSG-RAN WG1 Meeting #89, Hangzhou, P. R. China, May 15-19, 2017, 3 pages.

Panasonic, "Repetition/retransmission of UL grant-free", R1-1708115, 3GPP TSG RAN WG1 Meeting #89, Hangzhou, P.R. China May 15-19, 2017, 2 pages.

Samsung, "UE-Common NR-PDCCH Transmission Aspects", R1-1707999, 3GPP TSG RAN WG1 #89, Hangzhou, China, May 15-19, 2017, 3 pages.

Ericsson, "Grant Free and Semi-Persistent Scheduling in NR," R2-1707174, 3GPP TSG-RAN WG2 #AH, Qingdao, P.R. of China, Jun. 27-29, 2017, 4 pages.

Extended European Search Report in European Appln. No. 18841905.5, dated Feb. 9, 2021, 12 pages.

Lenovo, Motorola Mobility, "Discussion of Procedures for UL Transmission with and without grant," R1-1707766, 3GPP TSG RAN WG1 Meeting #89, Hangzhou, China, May 15-19, 2017, 4 pages.

ZTE, "Consideration on grant-free transmission," R2-1704699, 3GPP TSG-RAN WG2 Meeting #98, Hangzhou, China, May 15-19, 2017, 5 pages.

* cited by examiner

METHOD FOR TRANSMITTING UPLINK SIGNAL OF TERMINAL IN WIRELESS COMMUNICATION SYSTEM AND TERMINAL USING SAME METHOD

CROSS-REFERENCE TO RELATED APPLICATIONS

This application is a National Stage application under 35 U.S.C. § 371 of International Application No. PCT/KR2018/008740, filed on Aug. 1, 2018, which claims the benefit of U.S. Provisional Application No. 62/540,552 filed on Aug. 2, 2017. The disclosures of the prior applications are incorporated by reference in their entirety.

BACKGROUNDS

Field of the Disclosure

The present disclosure relates to wireless communication and, more particularly, to a method for transmitting an uplink signal in a wireless communication system and a terminal using the same method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication.

In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

In future wireless communication systems such as the NR, the introduction of a scheme for greatly reducing a transmission delay depending on the application field is considered. In particular, in uplink (UL) transmission, instead of UL transmission according to an existing UL grant-based scheduling, the introduction of grant-free UL transmission in which uplink transmission is started by determination of a terminal is also considered.

However, there may be some problems in grant-free UL transmission.

First, even if grant-free UL transmission is configured, the UE does not perform UL transmission without a grant when there is no uplink data to be actually transmitted. In this case, there may be a problem that it is ambiguous for the base station as to whether UL transmission is properly configured in the UE.

Second, a plurality of resource sets that can be used for UL transmission without grant may be configured, and activation/deactivation of grant-free UL transmission may be performed by one-time signaling. In this case, there may be a problem that it is ambiguous as to which resource set of the plurality of resource sets is used for grant-free UL transmission.

Third, in the case where a plurality of resource sets that can be used for grant-free UL transmission is configured through a higher layer signal such as a radio resource control (RRC) signal, when it is necessary to change the resource sets because the amount of uplink traffic/characteristics is changed, an RRC configuration process may be necessary. At this point, inconsistency between the terminal and the base station may occur regarding which resource set is used to perform grant-free UL transmission in the RRC resetting process.

There is a need for a method and an apparatus that can solve the aforementioned problems.

SUMMARY

The present disclosure provides a method for transmitting an uplink signal of a terminal in a wireless communication system, and a terminal using the same method.

In one aspect, a method for transmitting an uplink (UL) signal of a terminal in a wireless communication system is provided. The method comprises receiving activation information for activating or deactivating a specific resource set from among a plurality of resource sets; and when the activation information activates the specific resource set, performing grant-free UL transmission using a resource belonging to the specific resource set.

The activation information may be received through downlink control information (DCI).

The activation information may comprise an identity (ID) of the specific resource set.

The UL transmission may be a transmission of a physical uplink shared channel (PUSCH).

The grant-free UL transmission may be transmitting, by the terminal, the PUSCH using any of resources belonging to the specific resource set without a UL grant for scheduling the PUSCH.

A response to the activation information may be transmitted by the terminal.

An acknowledgement to the activation information may be transmitted as the response.

A sounding reference signal (SRS) may be transmitted as the response.

Channel state information (CSI) may be transmitted as the response.

A physical random access channel (PRACH) may be transmitted as the response.

The plurality of resource sets may be configured by a radio resource control (RRC) signal.

At least one resource set from among the plurality of resource sets may be used for a fallback operation in an RRC reconfiguration period.

A physical layer signal indicating use of the at least one resource set may be further received.

The activation information may use a scrambling or cyclic redundancy check (CRC) masking sequence specific to the specific resource set.

In another aspect, provided is a terminal, comprising a transceiver configured to transmit and receive a radio signal; and a processor configured to operate with being connected to the transceiver, wherein the processor is further configured to receive activation information for activating or deactivating a specific resource set from among a plurality of resource sets, and, when the activation information activates the specific resource set, perform grant-free uplink (UL) transmission using a resource belonging to the specific resource set.

Since a response to a signal for setting (activating/deactivating) the grant-free UL transmission is transmitted, ambiguity is reduced as to whether or not the grant-free UL transmission is set. In addition, a signal for setting (activating/deactivating) grant-free UL transmission indicates which resource set among resource sets that can be used for grant-free UL transmission, thereby reducing ambiguity as to a resource used for grant-free UL transmission. In addition, when a plurality of resource sets that can be used for grant-free UL transmission is configured through a higher layer signal such as a radio resource control (RRC) signal, a resource set used for a fallback operation is introduced/used in an RRC reconfiguration period, thereby reducing ambiguity as to a resource set to be used in the RRC reconfiguration period.

DESCRIPTION OF EXEMPLARY EMBODIMENTS

Figure 1:
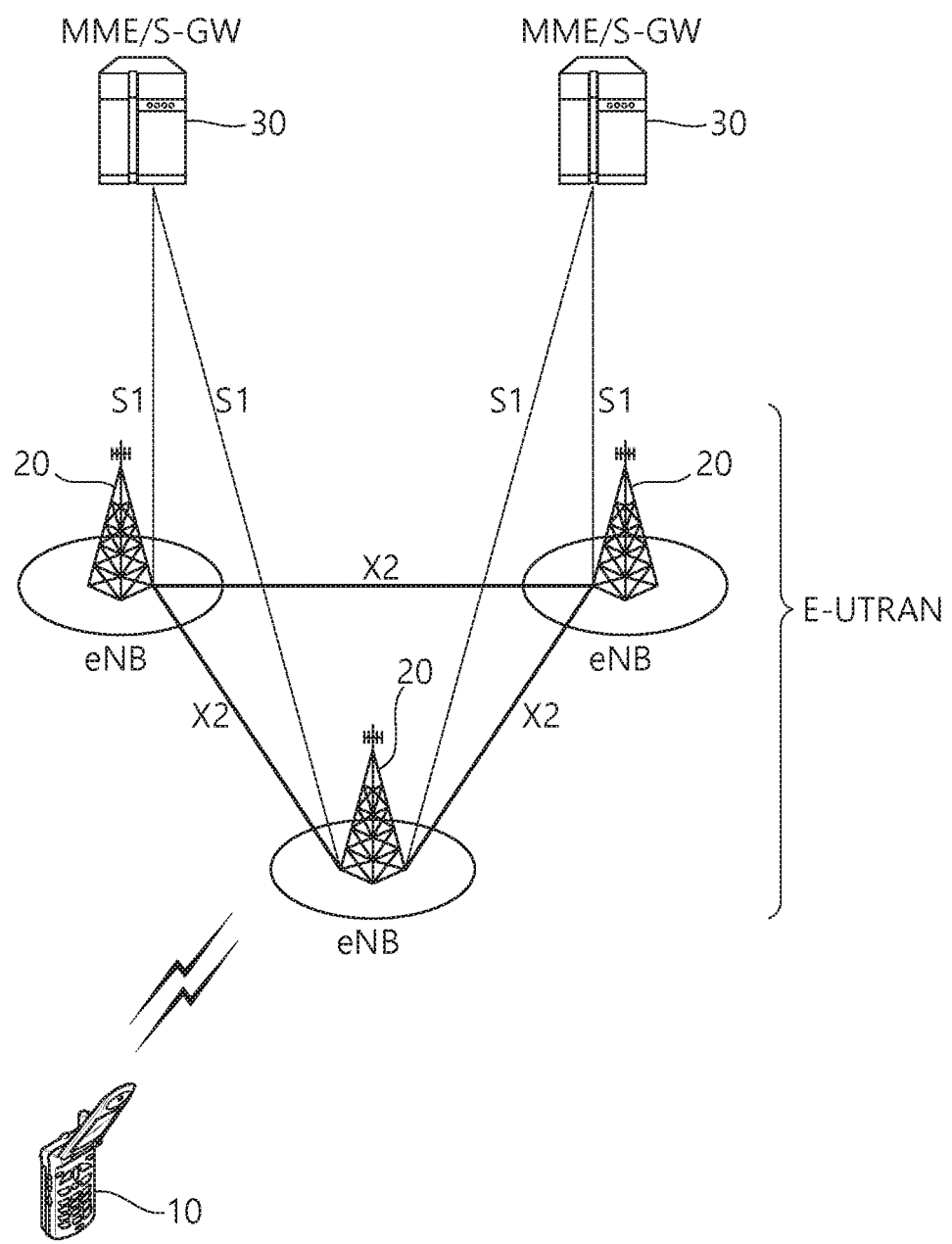
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
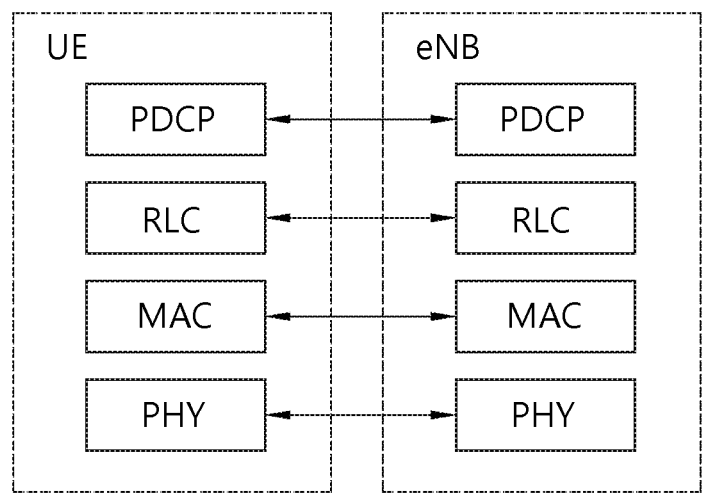
FIG. 2 is a diagram showing a wireless protocol architecture for a user plane.
Figure 3:
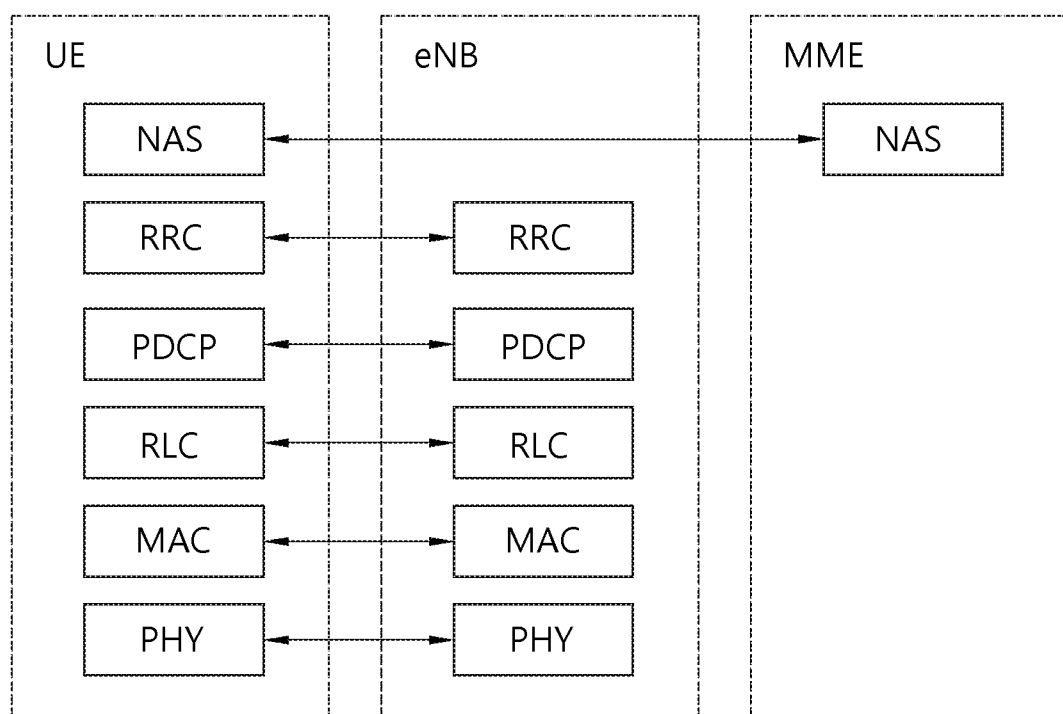
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
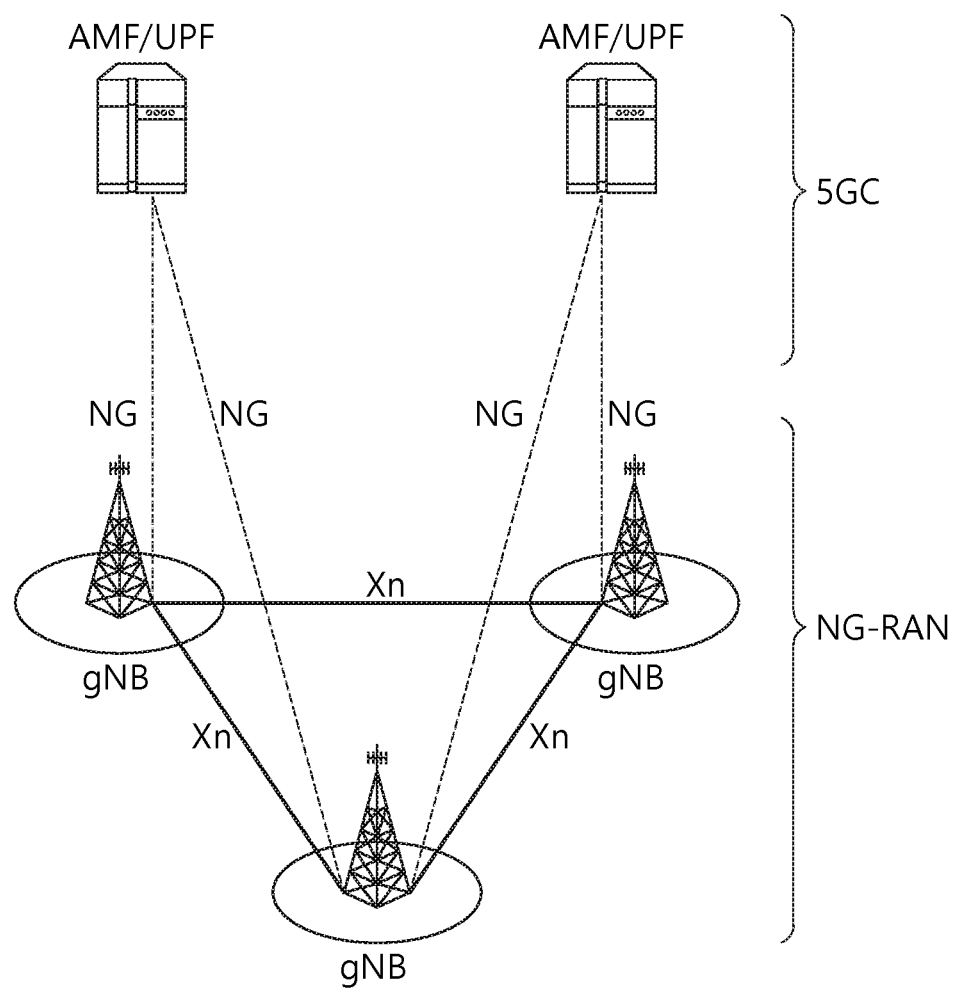
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions of inter-cell radio resource management (Inter Cell RRM), radio bearer management (RB control), connection mobility control, radio admission control, and measurement setup and provision, dynamic resource allocation, and the like. The AMF may provide functions such as NAS security, idle state mobility handling, and the like. The UPF may provide functions such as mobility anchoring, PDU processing, and the like.

Figure 5:
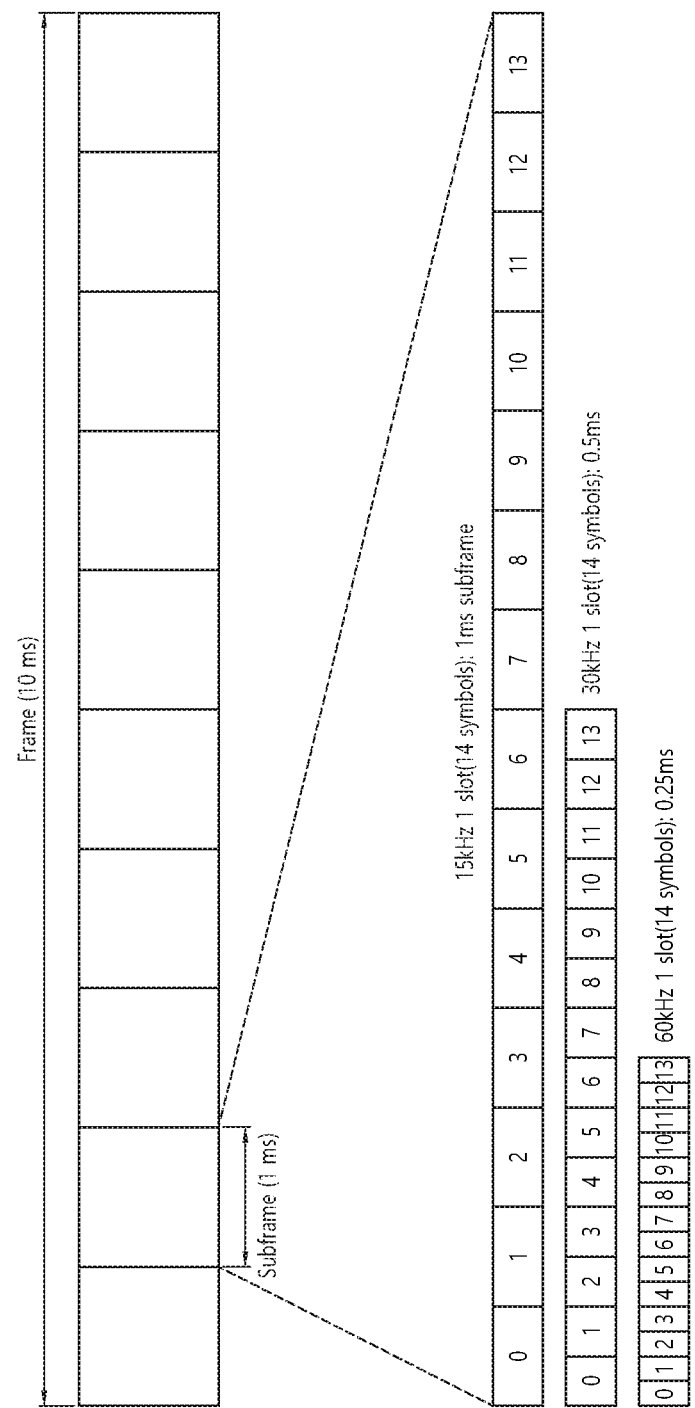
FIG. 5 illustrates an example of a frame structure that may be applied in NR.

FIG. 5 illustrates an example of a frame structure that may be applied in NR.

Referring to FIG. 5, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration $\mu$.

TABLE 1

| $\mu$ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 5, $\mu$=0, 1, 2 is illustrated.

A slot may include a plurality of orthogonal frequency division multiplexing (OFDM) symbols. The plurality of OFDM symbols in the slot may be divided into downlink symbols (denoted as D), flexible symbols (denoted as X), and uplink symbols (denoted as U). The format of the slot may be determined according to which of the D, X, and U are configured in the slot as the OFDM symbols.

The following table shows an example of a slot format.

TABLE 3

| For- | Symbol number in a slot | | | | | | | | | | | | | |
| --- | --- | --- | --- | --- | --- | --- | --- | --- | --- | --- | --- | --- | --- | --- |
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |

TABLE 3-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | X | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | X | X | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | X | X | U | U | U | U | U | U | U |
| 46 | D | D | D | D | X | U | D | D | D | D | D | X | U | U |
| 47 | D | D | X | U | U | U | D | X | U | U | U | U | U | U |
| 48 | D | X | U | U | U | U | D | X | U | U | U | U | U | U |
| 49 | D | D | D | X | X | U | D | D | D | X | X | U | U | U |
| 50 | D | X | X | U | U | U | D | X | X | U | U | U | U | U |
| 51 | D | X | X | U | U | U | D | X | X | U | U | U | U | U |
| 52 | D | X | X | X | X | U | D | X | X | X | X | U | U | U |
| 53 | D | D | X | X | X | U | D | X | X | X | X | U | U | U |
| 54 | X | X | X | X | X | X | D | D | D | D | D | D | D | D |
| 55 | D | D | X | X | X | U | U | U | D | D | D | D | D | D |
| 56-255 | | | | | | Reserved | | | | | | | | |

The terminal may be configured with the format of the slot through a higher layer signal, the format of the slot through DCI, or the format of the slot based on a combination of the higher layer signal and the DCI.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |

TABLE 4-continued

| Aggregation level | Number of CCEs |
|---|---|
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called control resource set (CORESET) can be introduced. The terminal may receive the PDCCH in the CORESET.

Figure 6:
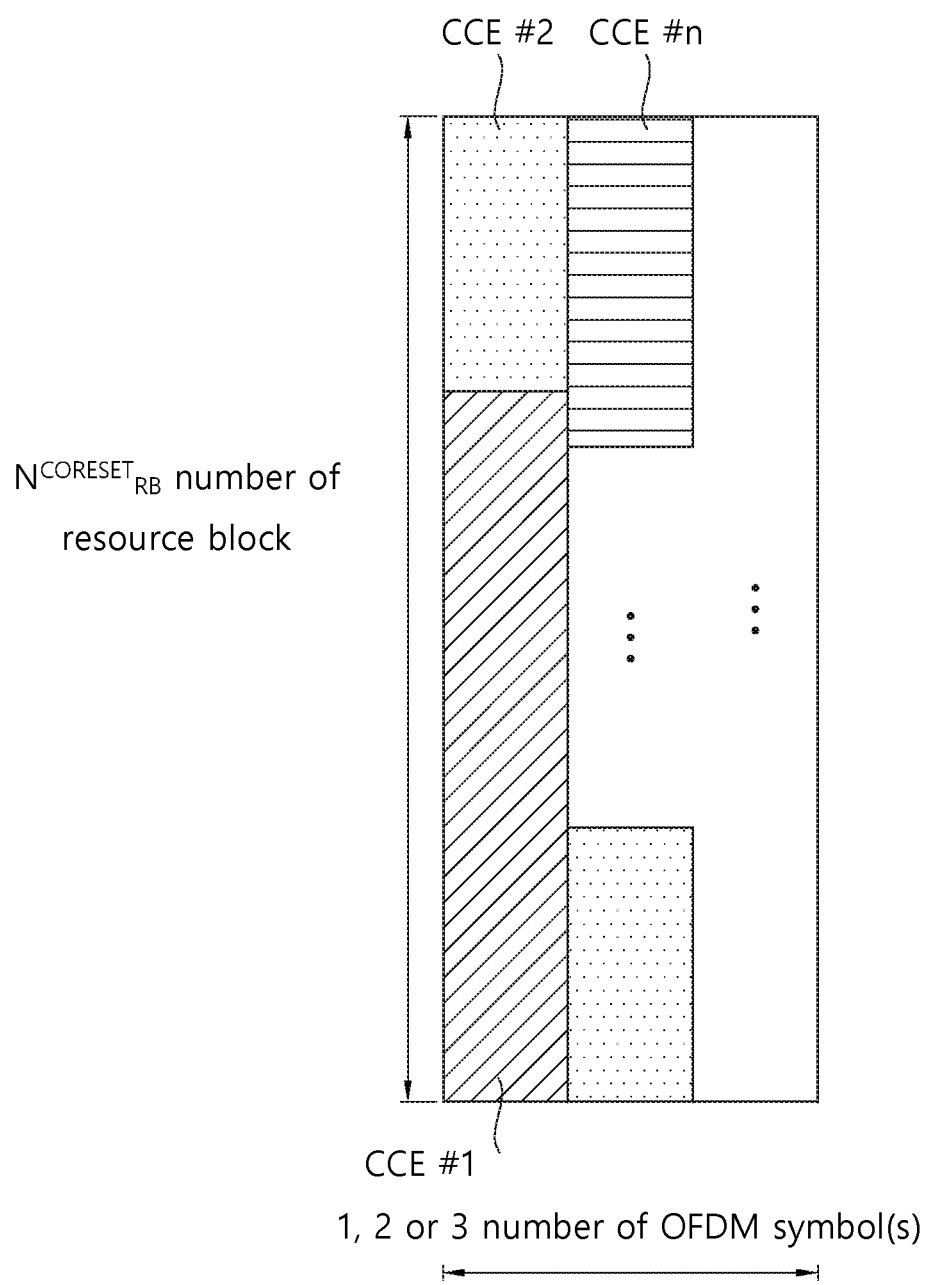
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
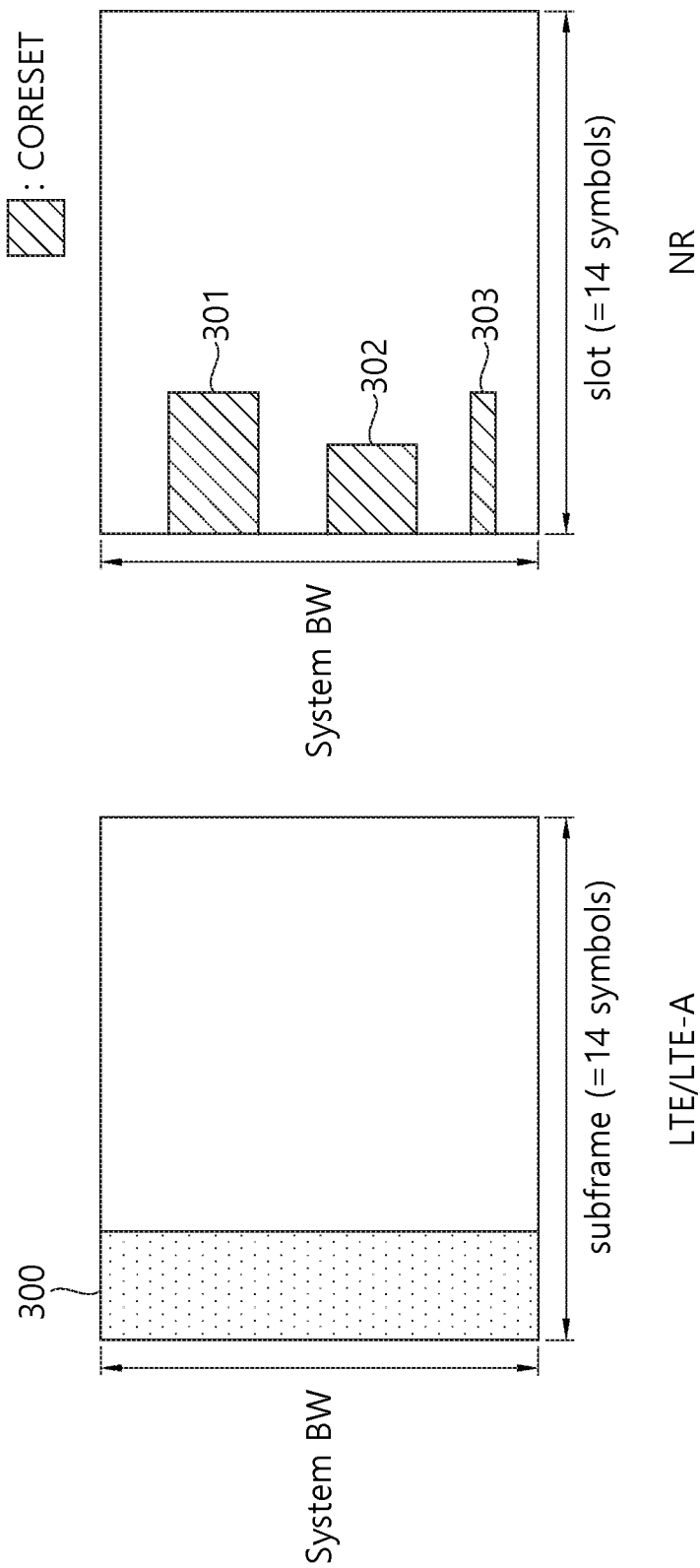
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 6, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Figure 8:
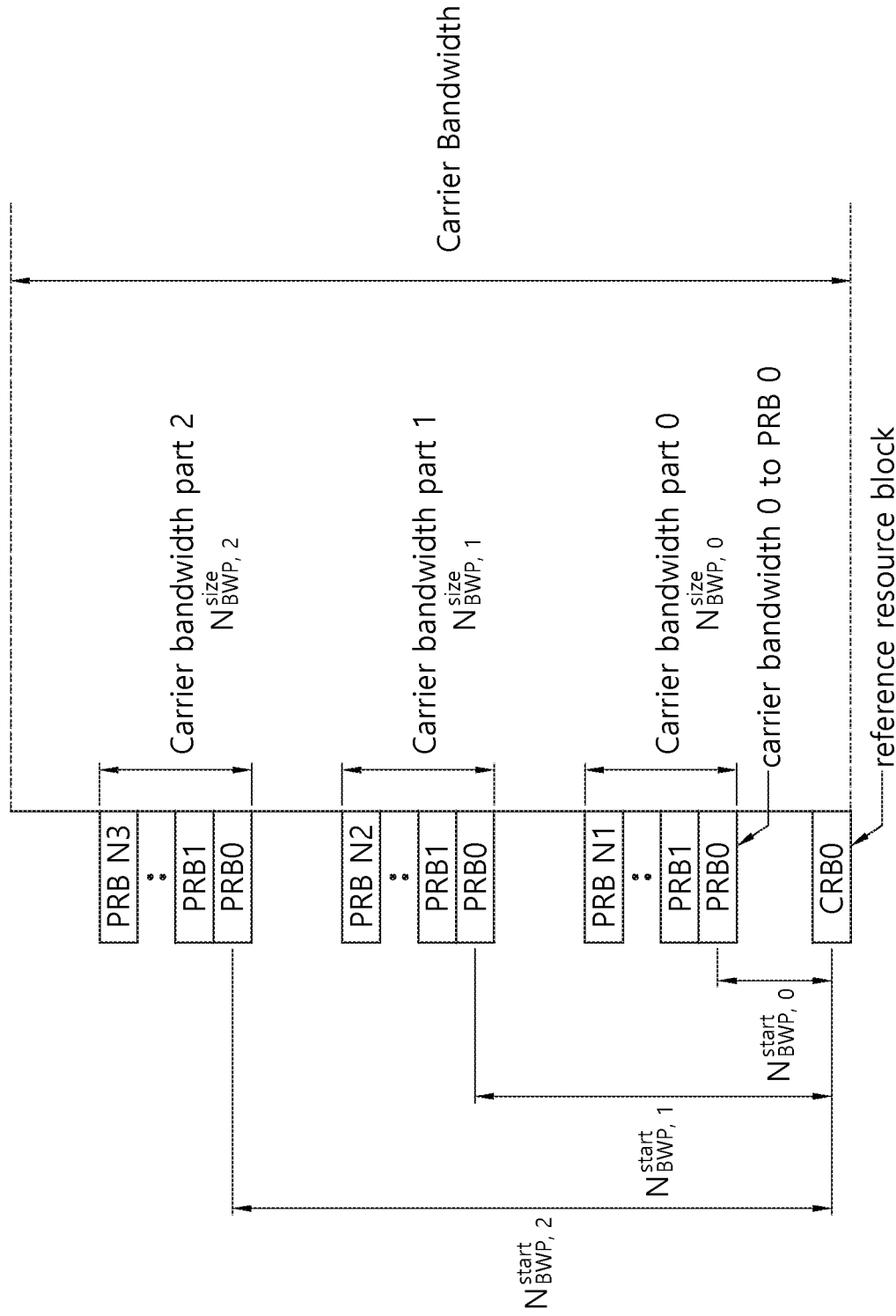
FIG. 8 illustrates a carrier bandwidth part that has been newly introduced in NR.

FIG. 8 illustrates a carrier bandwidth part that has been newly introduced in NR.

Referring to FIG. 8, the carrier bandwidth part may be simply abbreviated as a bandwidth part (BWP). As described above, in the future wireless communication system, various numerologies (e.g., various subcarrier spacings) may be supported for the same carrier. NR may define a common resource block (CRB) for a given numerology on a given carrier.

The bandwidth part is a set of contiguous physical resource blocks (PRBs) selected from contiguous subsets of common resource blocks (CRBs) for a given numerology on a given carrier.

As illustrated in FIG. 8, a common resource block may be determined according to a numerology for which carrier bandwidth, for example, a subcarrier spacing, is used. The common resource block may be indexed from the lowest frequency of the carrier bandwidth (starting from 0), and a resource grid based on the common resource block may be defined (referred to as a common resource block resource grid). .

The bandwidth part may be indicated based on a CRB having the lowest index (referred to as CRB 0). The CRB 0 having the lowest index may be also referred to as point A.

For example, under a given numerology of a given carrier, i-th bandwidth part may be indicated by NstartBWP,i and NsizeBWP,i. NstartBWP,i may indicate a start CRB of the i-th BWP on the basis of CRB 0, and NsizeBWP,i may indicate the size of the i-th bandwidth in the frequency domain (for example, based on a PRB unit). PRBs in each BWP may be indexed from 0. The index of the CRB in each BWP may be mapped to the index of the PRB. For example, the index of the CRB in each BWP may be mapped as nCRB=nPRB+NstartBWP,i.

A terminal may be configured with up to four downlink bandwidth parts in downlink, but only one downlink bandwidth part may be activated at a given time point. The terminal does not expect to receive a PDSCH, a PDCCH, a CSI-RS, etc. out of the downlink bandwidth part activated among the downlink bandwidth parts. Each downlink bandwidth part may include at least one CORESET.

The terminal may be configured with up to four uplink bandwidth parts in uplink, but only one uplink bandwidth part may be activated at a given time point. The terminal does not transmit a PUSCH, a PUCCH, etc. out of the uplink bandwidth part activated among the uplink bandwidth parts.

NR operates in a broader band compared to the legacy system, and not all terminals may support such broadband. The bandwidth part (BWP) may have a feature of enabling a terminal incapable of supporting the broadband to operate.

<Self-Contained Subframe Structure>

Figure 9:
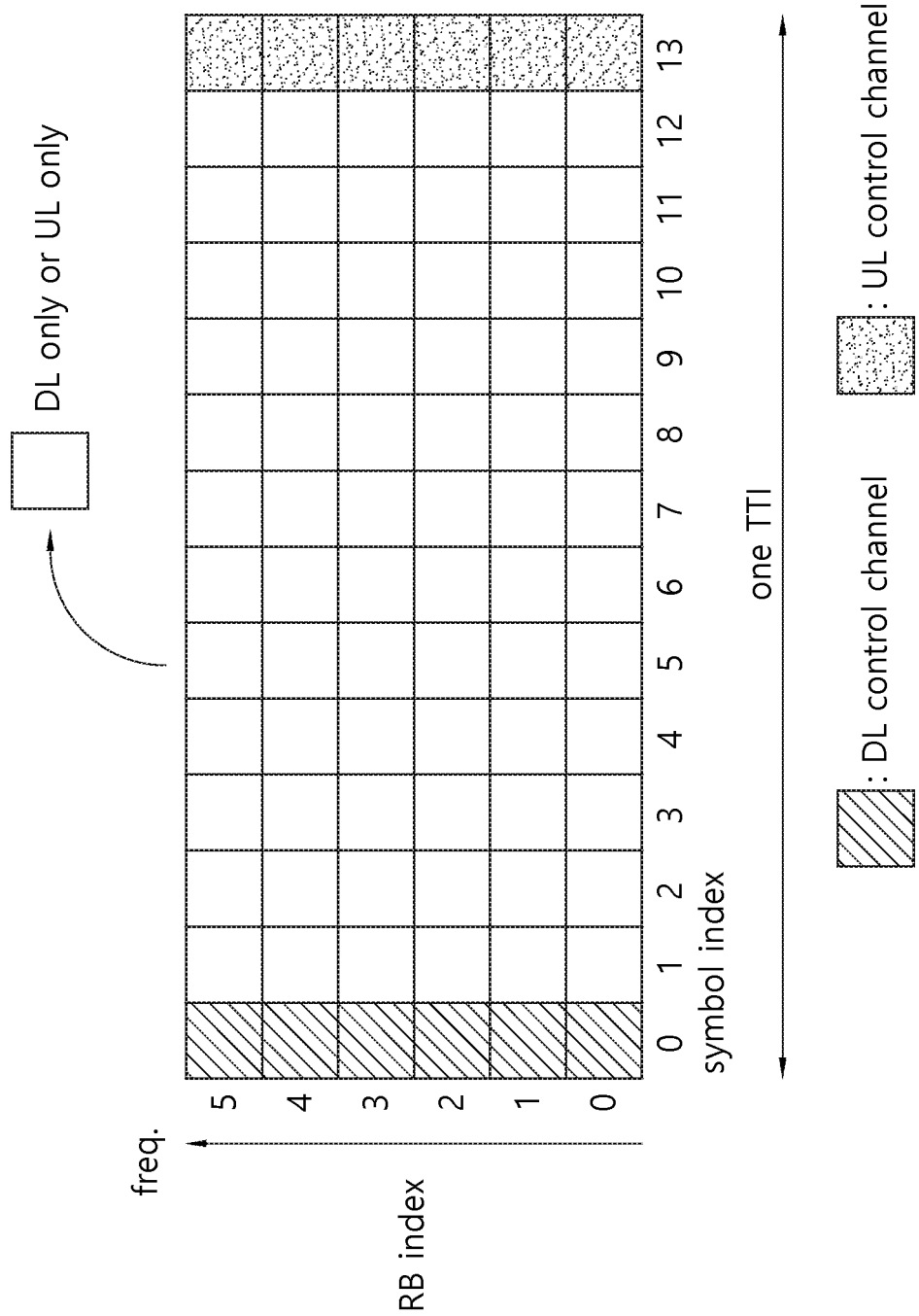
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 4×4 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

Figure 10:
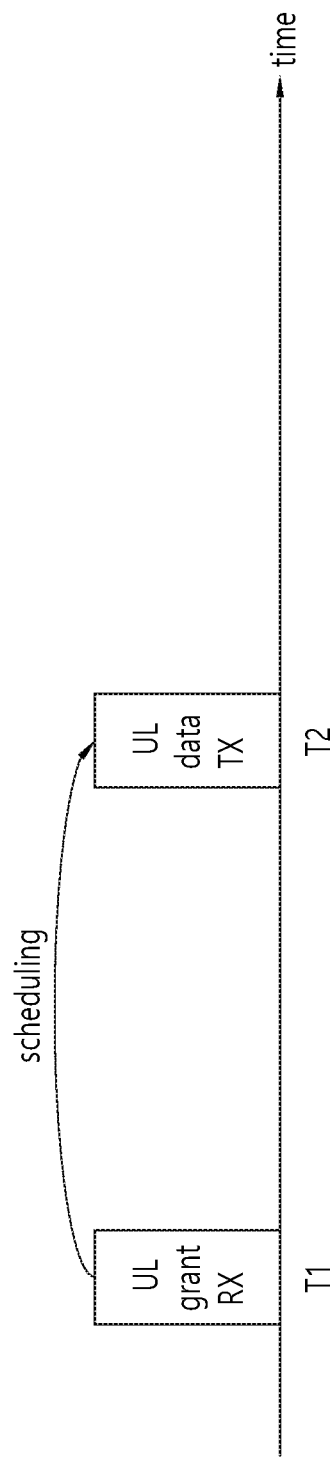
FIG. 10 illustrates an existing UL transmission method.

FIG. 10 illustrates an existing UL transmission method.

Referring to FIG. 10, a terminal receives an UL grant at a time point T1 and transmits UL data at a time point T2. At least one of a time resource and a frequency resource used for the UL data transmission may be indicated by the UL grant, which may be also expressed as the UL data transmission is scheduled by the UL grant. The time points T1 and T2 may be predetermined, the time point T2 may be indicated by the UL grant, or the time point T2 may be determined dependently on the time point T1.

Unlike the legacy UL transmission, the present disclosure relates to uplink grant-free UL transmission. Specifically, a physical layer (L1) signaling method for efficiently operating when (re)configuring a resource for grant-free UL transmission (UL transmission), and an operating method during an RRC reconfiguration period are proposed.

In the future wireless communication system, the introduction of a method of greatly reducing transmission latency depending on the application field is considered. In particular, in UL transmission, instead of an existing method which is scheduling based on a UL grant, introduction of a method in which UL transmission is started by determination of a terminal (the method which can be referred to as a grant-free UL transmission since UL transmission is started without a UL grant) is considered.

More specifically, the base station may set a resource set for grant-free UL transmission and may instruct or inform the terminal of the resource set. In this case, the terminal may start UL transmission even without a UL grant. Resources for grant-free UL transmission may be configured through RRC configuration and/or physical layer (L1) signaling.

When resources are configured through an L1 signal, it is necessary to consider whether the terminal properly detects the L1 signal. This is because, depending on the amount of traffic, the terminal may not perform UL transmission regardless of whether the corresponding L1 signaling is detected. In this case, ambiguity may occur regarding grant-free UL transmission between the terminal and the base station.

In addition, when resources for grant-free UL transmission are configured only by the RRC configuration, a method of avoiding ambiguity may be needed during a RRC reconfiguration period.

The present disclosure proposes a method for reducing ambiguity when configuring resources for grant-free UL transmission.

In the present disclosure, information indicated by the base station, an operation of the base station, an operation of the terminal, or information indicated by the terminal are merely examples, and it is obvious that the idea of the present disclosure may be extended and applied to a reverse situation (that is, in which the roles of the base station and the terminal are reversed) or a situation a situation of being replaced with another node. In addition, although the embodiment has been described with respect to an UL transmission method, the idea of the present disclosure may be extended and applied even to downlink transmission, sidelink transmission, and the like.

<Operating Method of Terminal when Resources are Configured Based on L1 Signaling>

A resource for grant-free UL transmission (hereinafter, referred to as a GF resource) may be a resource after L1 signaling is transmitted. The L1 signaling may indicate at least a frequency resource for grant-free UL transmission.

In the future wireless communication system, timing information on 1) downlink control signals and downlink data and/or 2) uplink grant and uplink data (e.g., a timing difference between start points of a UL grant and uplink data or a timing difference from a end point of a control signal to a start point of data) may be set semi-statically or dynamically indicated in DCI.

Likewise, in designating a resource for grant-free UL transmission, a time point at which the resource starts may be set based on timing information in L1 signaling and L1 signaling. In grant-based UL transmission, timing information (a specific value and/or a range of values and/or whether it is semi-statically or dynamically changeable) may be set independently of grant-free UL transmission.

That is, timing information may be different depending on the setting. From a time point at which the L1 signal is received, a grant-free UL transmission resource (GF resource) may be set from slots corresponding to timing information indicated by an L1 signal. If semi-static timing is applied, it may be set based on UL grant-to-UL data timing. The above scheme may be applied to activation and/or deactivation and/or modification.

In the future wireless communication system, the terminal does not always need to transmit a PUSCH in a resource for grant-free UL transmission (GF resources) and may transmit the PUSCH only when there is at least UL traffic. That is, the UE does not transmit the PUSCH in the GF resource, for example, 1) when an L1 signal for configuring the GF resource is properly detected but there is no UL traffic, or 2) when (there is UL traffic) the L1 signal for configuring the GF resource is not properly detected.

Therefore, the fact that the terminal has not transmitted the PUSCH in the GF resource is not enough to allow the base station to know whether or not the terminal has not detected the L1 signal for configuring the GF resource, and thus, there may be ambiguity between the terminal and the base station.

Figure 11:
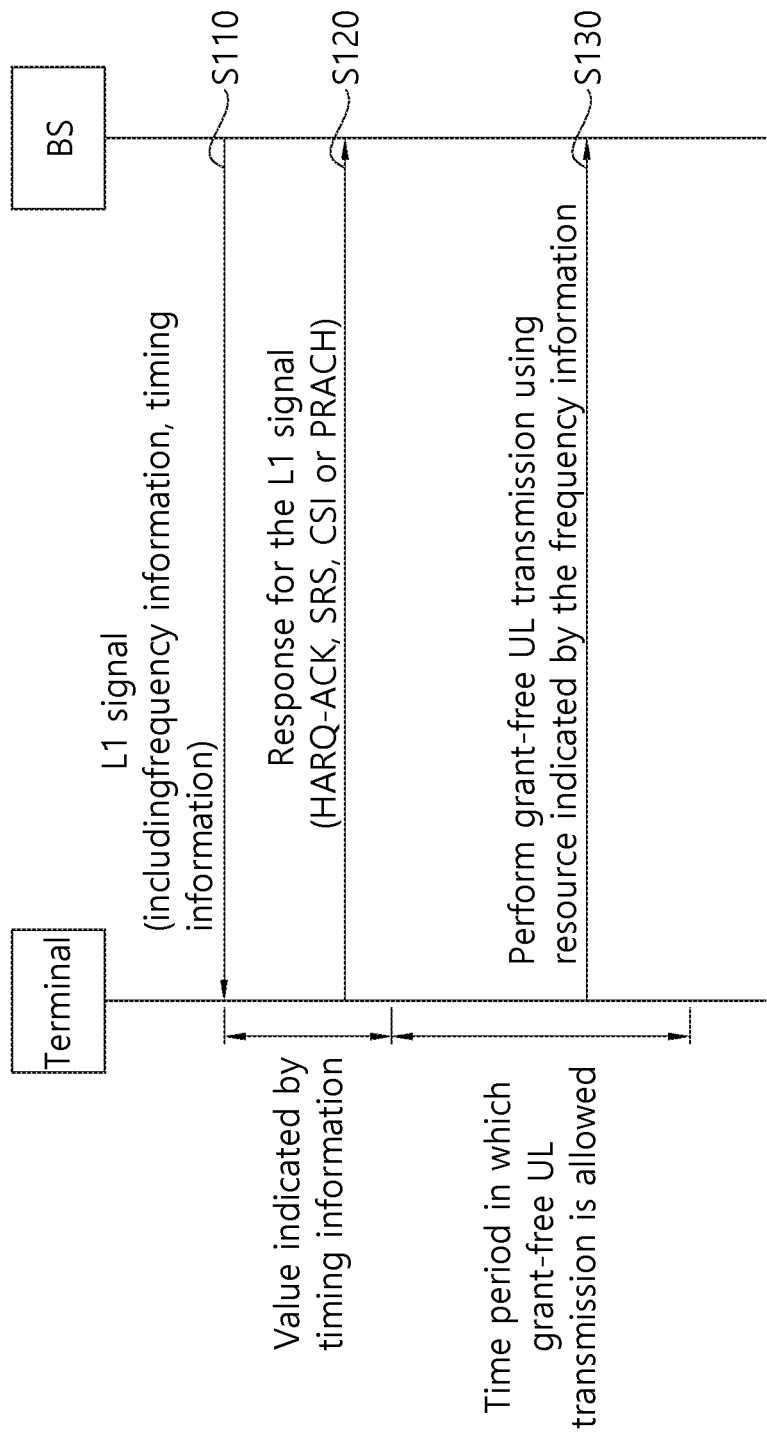
FIG. 11 illustrates an example of signaling between a terminal and a base station for a grant-free UL transmission operation.

FIG. 11 illustrates an example of signaling between a terminal and a base station for a grant-free UL transmission operation.

Referring to FIG. 11, the base station transmits an L1 signal (physical layer signal) for configuring grant-free UL transmission in a terminal (e.g., activation/deactivation of grant-free UL transmission and configuration of a resource/resource set for performing grant-free UL transmission) (S110). The L1 signal may include, for example, frequency information indicating a frequency available to be used for grant-free UL transmission and timing information indicating a time when grant-free UL transmission is allowed/supported.

The terminal transmits a response to the L1 signal to the base station (S120). That is, in the present disclosure, the terminal may send a response signal to the L1 signal.

The following is a more specific example of a response signal to the L1 signal for activation and/or deactivation. That is, the following are examples of implementing the step S120.

Embodiment 1: The terminal may perform HARQ-ACK feedback with respect to the L1 signal for activation and/or deactivation. The timing of the HARQ-ACK feedback may be after a specific time point from when the corresponding L1 signal is received. The specific time point may be the same as a UL grant-to-UL data timing or may be a timing difference between resources for an L1 signal for grant-free UL transmission. If the timing is dynamically indicated by the L1 signal, the timing may be changed according to the indication.

Embodiment 2: A sounding reference signal (SRS) request field may exist in the L1 signal for activation and/or deactivation. In this case, the SRS may be used as a response signal to the L1 signal. A time point at which the SRS is transmitted may be the first resource indicated through the L1 signal. Alternatively, the SRS may be transmitted after a certain period of time (or predefined or signaled by a higher layer and/or set by a dynamic indication) from a time point when the L1 signal is received.

Embodiment 3: A CSI request field may exist in the L1 signal for activation and/or deactivation. In this case, the CSI may be used as a response signal to the L1 signal. Depending on the UL traffic, UL data may or may not be transmitted from the first resource, and thus, the same location and method of mapping CSI with or without UL data may be used to avoid ambiguity.

Embodiment 4: When the terminal receives an L1 signal for activation and/or deactivation, the terminal may transmit a PRACH in response thereto. The above scheme may have an advantage when it comes to adjusting UL synch in advance in starting grant-free UL transmission. More specifically, whether to transmit the PRACH may be indicated by the L1 signal.

Referring back to FIG. 11, grant-free UL transmission may be possible after a time point indicated by the timing information (or during a time period) based on the time point at which the L1 signal is received.

In a time period in which grant-free UL transmission is possible, the terminal performs grant-free UL transmission to the base station (S130). At this point, grant-free UL transmission may be performed using a resource indicated by the frequency information.

Figure 12:
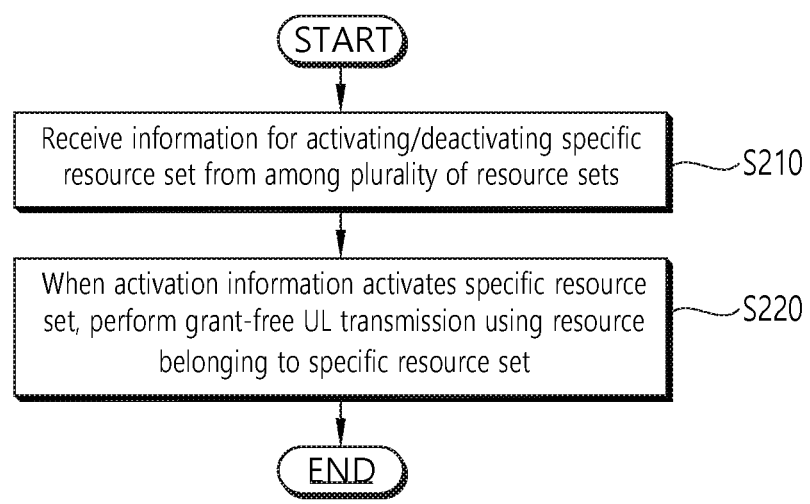
FIG. 12 illustrates a method of performing grant-free UL transmission.

FIG. 12 illustrates a method of performing grant-free UL transmission.

Referring to FIG. 12, the terminal receives activation information for activating or deactivating a specific resource set from a plurality of resource sets (S210), and, when the activation information activates a resource set, grant-free UL transmission is performed using a resource belonging to the specific resource set (S220). The activation information may be received through downlink control information (DCI).

The activation information may include an identity (ID) of the specific resource set. The UL transmission may be a physical uplink shared channel (PUSCH) transmission, and the grant-free UL transmission may indicate that the terminal transmits the PUSCH using any resource from among resources belonging to the specific resource set without an uplink grant for scheduling the PUSCH.

That is, in the future wireless communication system, a plurality of resource sets for grant-free UL transmission may be configured. For example, the base station may configure a resource set for UL transmission for UL SPS and latency reduction, and, even for the latency reduction purpose, various resource sets may be set according to the amount or characteristics of traffic.

Whether each resource set is to be configured based on an RRC configuration without an L1 signal or based on the L1 signal may be designated for each resource set. Then, it may be advantageous especially when an application of grant-free UL transmission is different.

In another scheme, even when a plurality of resource sets is introduced, whether a resource set is to be configured based on an RRC configuring method without an L1 signal or based on the L1 signal may be set UE-specifically. In this case, whether to use or not the resource set may be determined according to the reliability of the L1 signal.

In the case where a plurality of resource sets for grant-free UL transmission is configured/supported by the L1 signal, when activation or deactivation of the plurality of resource sets is performed through a single L1 signal, the payload size of the signal may be excessively large. In order to alleviate the problem, overhead may be reduced by setting candidate parameters for the plurality of resource sets through an RRC signal and selecting one of the candidates through an L1 signal.

In another scheme, an L1 signal for activation or deactivation of each resource set may be supported. For example, the L1 signal may include information indicating a resource set ID or which grant-free UL transmission in the corresponding DCI.

Through the information, it may be possible to know which resource set is to be activated or deactivated by the L1 signal. Alternatively, the L1 signal for activation or deactivation of each resource set may have different data scrambles and/or cyclic redundancy check (CRC) masking sequences.

Figure 13:
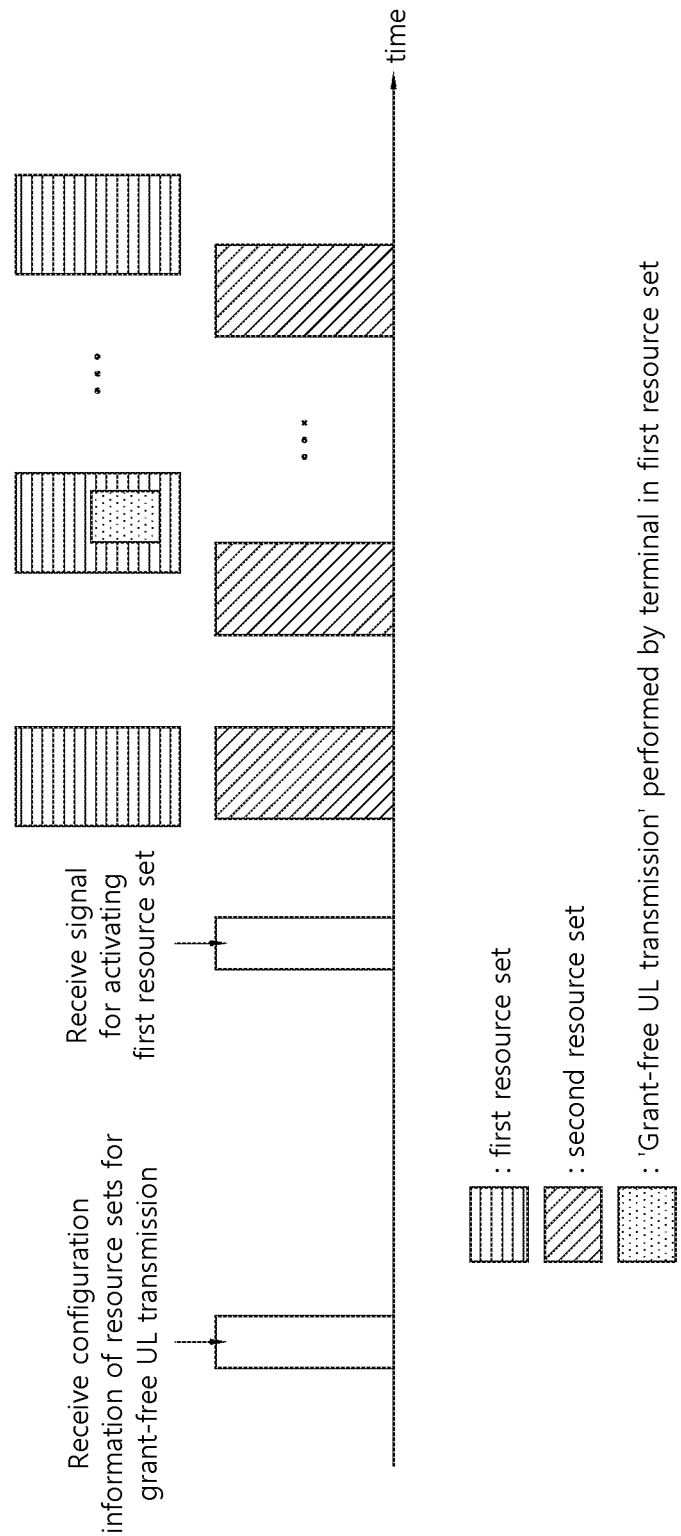
FIG. 13 illustrates an example of an operation of a terminal when a plurality of resource sets for grant-free UL transmission is configured.

FIG. 13 illustrates an example of an operation of a terminal when a plurality of resource sets for grant-free UL transmission is configured.

Referring to FIG. 13, the terminal may receive configuration information for configuring a plurality of resource sets for grant-free UL transmission, for example, a first resource set and a second resource set. The configuration information may be transmitted by the base station using the RRC signal or an L1 signal.

The terminal may receive a signal for activating (or deactivating, and activating is herein described as an example) a specific resource set, for example, a first resource set, from among the plurality of resource sets. The activation signal may be an L1 signal and may include information indicating the specific resource set, for example, an ID of the specific resource set.

Then, the terminal may perform grant-free UL transmission through any resource determined by the selection of the terminal from among resources belonging to the first resource set.

<Method of Operation of Terminal when Resource is Configured Based on RRC Configuration Without L1 Signal>

In a future wireless communication system, it is possible to configure a resource or a resource set (GF resource) for grant-free UL transmission simply by setting RRC configuration without an L1 signal.

In general, a resource set may be configured in the form of RRC configuration before UL traffic occurs. However, since the amount or characteristic of traffic changes as time passes, it may be necessary to change a resource set, and the change may be performed through an RRC reconfiguration process.

However, there may be misalignment in resource sets between the terminal and the base station (gNB) during an RRC reconfiguration period. For example, if the base station transmits an RRC reconfiguration message but the terminal does not receive the RRC reconfiguration message properly, there may be misalignment in resource recognition used for grant-free UL transmission between the base station and the terminal. Thus, a fallback operation may be required. For the above scheme, at least a resource set to be used for the fallback operation in setting a resource set for grant-free UL transmission may be configured.

Even when a resource set for the fallback operation is configured, in the case of grant-free UL transmission, since the terminal performs transmission without the base station's instruction, the base station may need to instruct the UE whether to use the resource set.

In an example, before performing RRC reconfiguration or during the RRC reconfiguration, the base station may instruct the terminal through an L1 signal (e.g., PDCCH and/or PDSCH) to perform grant-free UL transmission using a specific resource set for a fallback operation. Alternatively, the base station may instruct the terminal through a media access (MAC) message to perform the grant-free UL transmission using a specific resource set (for a fallback operation).

Figure 14:
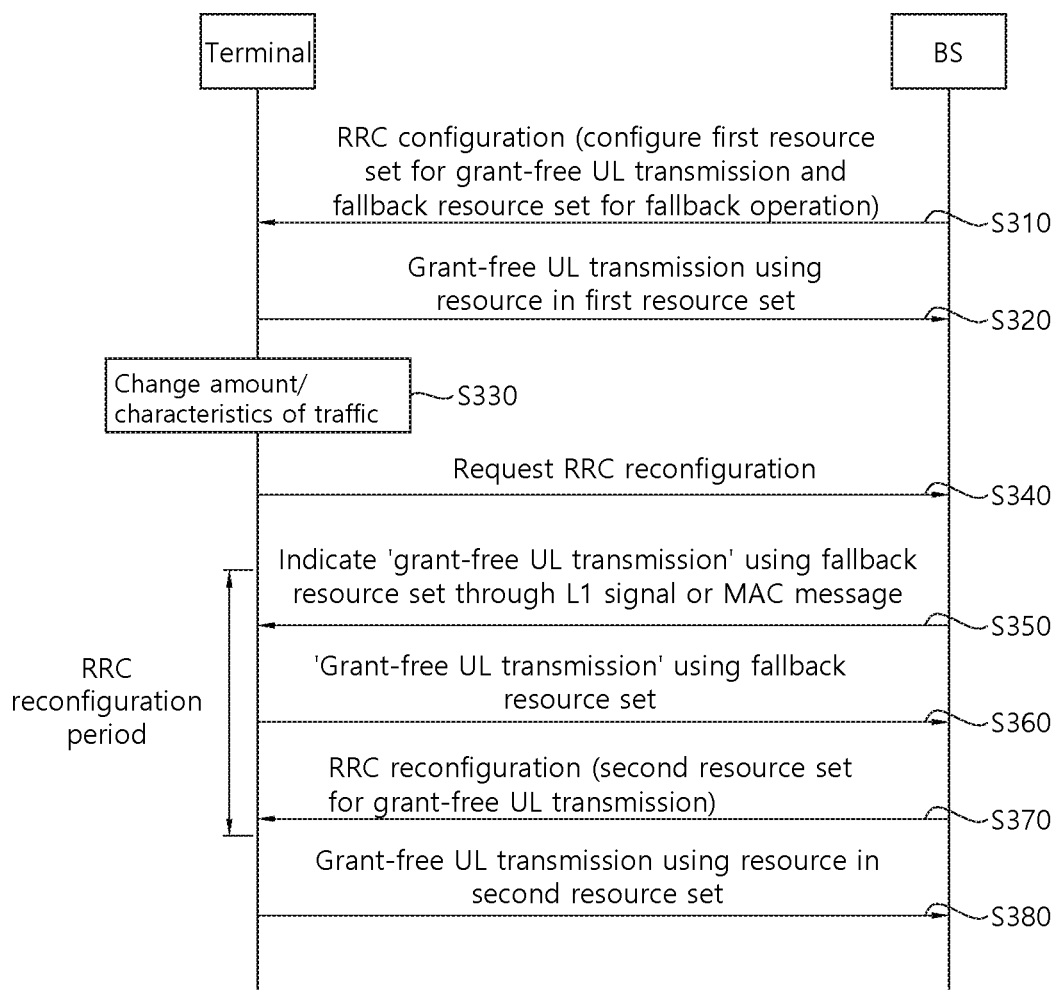
FIG. 14 illustrates another example of an uplink signal transmission method of a terminal in a wireless communication system.

FIG. 14 illustrates another example of an uplink signal transmission method of a terminal in a wireless communication system.

Referring to FIG. 14, a base station transmits an RRC configuration to a terminal (S310). The RRC configuration may include, for example, information for configuring a first resource set for grant-free UL transmission and a fallback resource set for a fallback operation.

The terminal may perform grant-free UL transmission using resources in the first resource set (S320).

As time passes, an amount or characteristics of traffic of the terminal may be changed (S330). In this case, the terminal may request the RRC reconfiguration to the base station (S340).

In this case, the base station first transmits an L1 signal or a media access control (MAC) message indicating "grant-free UL transmission" using the fallback resource set to the terminal (S350). Then, the terminal performs grant-free UL transmission using the fallback resource set in the RRC reconfiguration period (S360).

The base station transmits an RRC reconfiguration message to the terminal (S370). The RRC reconfiguration message may set/indicate a second resource set for grant-free UL transmission.

The terminal performs grant-free transmission using resources in the second resource set (S380). The second resource set may be resources determined in consideration of the changed amount/characteristic of the terminal traffic, and thus, the grant-free UL transmission of the terminal may be more efficient.

According to the present disclosure described above, it is possible to efficiently manage resources for grant-free UL transmission.

Figure 15:
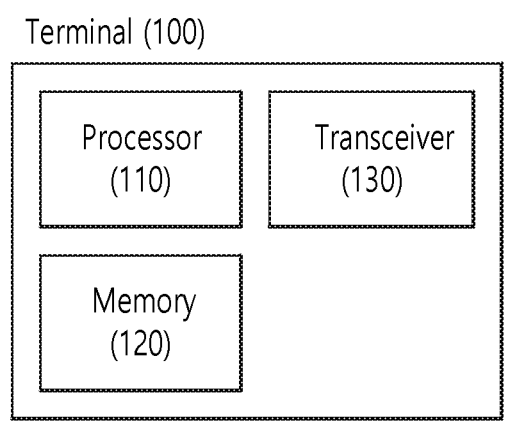
FIG. 15 is a block diagram of an apparatus in which an embodiment of the present disclosure is implemented.

FIG. 15 is a block diagram of an apparatus in which an embodiment of the present disclosure is implemented.

Referring to FIG. 15, an apparatus 100 includes a processor 110, a memory 120, and a transceiver 130. The processor 110 implements the proposed functions, processes, and/or methods. The memory 120 is connected to the processor 110 and stores various types of information for driving the processor 110. The transceiver 130 is connected to the processor 110 to transmit and/or receive a radio signal.

The device 100 may be a base station or a terminal.

The processor 110 may include an application-specific integrated circuit (ASIC), a different chipset, a logic circuit, a data processing device, and/or a converter for converting baseband signals and radio signals to and from each other. The memory 120 may include a read-only memory (ROM), a random access memory (RAM), a flash memory, a memory card, a storage medium, and/or any other storage device. The transceiver 130 may include one or more antennas for transmitting and/or receiving radio signals. When the embodiment is implemented in software, the above-described technique may be implemented as a module (a process, a function, etc.) for performing the above-described function. The module may be stored in the memory 120 and executed by the processor 110. The memory 120 may be provided inside or outside the processor 110 and may be connected to the processor 110 using any of various well-known means.

What is claimed is:

1. A method for transmitting an uplink (UL) signal by a terminal in a wireless communication system, the method comprising:
   receiving, from a base station, downlink control information (DCI) including (i) activation information for activating or deactivating a specific resource set from among a plurality of resource sets and (ii) a request field for transmitting a sounding reference signal (SRS);
   transmitting the SRS to the base station using a first resource included in the specific resource set in response to the DCI; and
   performing grant-free UL transmission using a resource belonging to the specific resource set,
   wherein the DCI includes a cyclic redundancy check (CRC) masking sequence corresponding to the specific resource set.

2. The method of claim 1, wherein the terminal performs the grant-free UL transmission during a time duration, and wherein the time duration is pre-determined.

3. The method of claim 1, wherein the activation information comprises an identity (ID) of the specific resource set.

4. The method of claim 1, wherein the UL transmission is transmission of a physical uplink shared channel (PUSCH).

5. The method of claim 4, wherein the grant-free UL transmission is transmitting, by the terminal, the PUSCH using any of resources belonging to the specific resource set without a UL grant for scheduling the PUSCH.

6. The method of claim 1, wherein an acknowledgement to the activation information is transmitted as a response to the DCI.

7. The method of claim 1, wherein the plurality of resource sets is configured by a radio resource control (RRC) signal.

8. The method of claim 7, wherein at least one resource set from among the plurality of resource sets is used for a fallback operation in an RRC reconfiguration period.

9. The method of claim 8, wherein a physical layer signal indicating use of the at least one resource set is further received.

10. The method of claim 1, wherein the activation information uses a scrambling or cyclic redundancy check (CRC) masking sequence specific to the specific resource set.

11. The method of claim 1, wherein the plurality of resource sets corresponds to different CRC masking sequences.

12. A terminal, comprising:
   a transceiver configured to transmit and receive a radio signal; and
   a processor configured to operate with being connected to the transceiver,
   wherein the processor is further configured to:
   receive, from a base station, downlink control information (DCI) including (i) activation information for activating or deactivating a specific resource set from among a plurality of resource sets and (ii) a request field for transmitting a sounding reference signal (SRS);
   transmit the SRS to the base station using a first resource included in the specific resource set in response to the DCI; and
   perform grant-free uplink (UL) transmission using a resource belonging to the specific resource set,
   wherein the DCI includes a cyclic redundancy check (CRC) masking sequence corresponding to the specific resource set.

* * * * *